(12) United States Patent
Spay et al.

(10) Patent No.: US 10,890,565 B2
(45) Date of Patent: Jan. 12, 2021

(54) PORTABLE PHASED ARRAY TEST INSTRUMENT

(71) Applicant: OLYMPUS AMERICA INC., Center Valley, PA (US)

(72) Inventors: Benjamin Spay, Quebec (CA);
Francois Houde, Quebec (CA);
Christian Gauvin, Quebec (CA);
Jean-Sebastien Langlois, Quebec (CA); Eric Bharucha,
St-Augustin-de-Desmaures (CA)

(73) Assignee: Olympus America Inc., Center Valley, PA (US)

( * ) Notice: Subject to any disclaimer, the term of this patent is extended or adjusted under 35 U.S.C. 154(b) by 0 days.

(21) Appl. No.: 16/012,361

(22) Filed: Jun. 19, 2018

(65) Prior Publication Data

US 2018/0372693 A1    Dec. 27, 2018

Related U.S. Application Data

(60) Provisional application No. 62/523,339, filed on Jun. 22, 2017.

(51) Int. Cl.
| | | |
|---|---|---|
| *G01N 29/26* | (2006.01) | |
| *G01N 29/22* | (2006.01) | |
| *G01N 29/265* | (2006.01) | |
| *G06F 8/61* | (2018.01) | |
| *G06F 8/65* | (2018.01) | |

(52) U.S. Cl.
CPC ........... *G01N 29/262* (2013.01); *G01N 29/22* (2013.01); *G01N 29/226* (2013.01); *G01N 29/265* (2013.01); *G06F 8/61* (2013.01); *G06F 8/65* (2013.01); *G01N 2291/106* (2013.01)

(58) Field of Classification Search
None
See application file for complete search history.

(56) References Cited

U.S. PATENT DOCUMENTS

| | | | | |
|---|---|---|---|---|
| 8,169,783 | B2 * | 5/2012 | Phillips | H01R 13/6275 361/728 |
| 8,242,363 | B2 * | 8/2012 | Hou | H01R 13/59 174/60 |
| 8,441,800 | B2 * | 5/2013 | Sasaki | H05K 7/20854 361/752 |
| 9,715,776 | B2 * | 7/2017 | Conlin | G07C 9/28 |
| 9,722,375 | B2 * | 8/2017 | Chang | H01R 31/005 |

(Continued)

FOREIGN PATENT DOCUMENTS

| | | |
|---|---|---|
| CN | 109115890 A | 1/2019 |
| EP | 3418733 A1 | 12/2018 |
| JP | 2006234636 A | 9/2006 |

OTHER PUBLICATIONS

"European Application Serial No. 18178912.4, Extended European Search Report dated Oct. 26, 2018", 7 pgs.

(Continued)

*Primary Examiner* — Xanthia C Cunningham
(74) *Attorney, Agent, or Firm* — Schwegman Lundberg & Woessner, P.A.

(57) ABSTRACT

Inventive features of a portable ultrasonic phased array test instrument are disclosed. The instrument has a battery rack that can be repurposed to host a re-programming module for testing and re-programming electronic components.

10 Claims, 11 Drawing Sheets

(56) References Cited

U.S. PATENT DOCUMENTS

| | | | |
|---|---|---|---|
| 9,853,397 B1* | 12/2017 | Bucher | H01R 13/6335 |
| 9,932,756 B1* | 4/2018 | Nickeas | E05B 47/00 |
| 10,121,101 B1* | 11/2018 | Warther | A45C 13/42 |
| 10,230,196 B2* | 3/2019 | Phillips | H01R 13/6278 |
| 2001/0045355 A1 | 11/2001 | Gephart et al. | |
| 2003/0171016 A1* | 9/2003 | Bright | H05K 9/0015 |
| | | | 439/160 |
| 2012/0296174 A1* | 11/2012 | McCombie | A61B 5/742 |
| | | | 600/301 |
| 2014/0184771 A1 | 7/2014 | Mazzetti et al. | |
| 2014/0353300 A1* | 12/2014 | Swiatek | H05B 1/0272 |
| | | | 219/211 |
| 2014/0371668 A1 | 12/2014 | Welsch et al. | |
| 2015/0099376 A1* | 4/2015 | Hashiguchi | H01R 13/2435 |
| | | | 439/66 |
| 2015/0122893 A1* | 5/2015 | Warther | G06K 7/10366 |
| | | | 235/492 |
| 2015/0248572 A1* | 9/2015 | Soule, III | G06F 8/63 |
| | | | 235/437 |
| 2015/0352967 A1* | 12/2015 | Timpf, Jr. | B60L 53/14 |
| | | | 320/109 |
| 2016/0174674 A1* | 6/2016 | Oberpriller | A45F 5/021 |
| | | | 224/222 |
| 2016/0183653 A1* | 6/2016 | Warther | G06K 19/07726 |
| | | | 340/10.51 |
| 2016/0346659 A1* | 12/2016 | April | A63B 69/0002 |
| 2017/0124369 A1* | 5/2017 | Rueblinger | G06F 1/1658 |
| 2017/0299460 A1* | 10/2017 | Duerr | G01N 29/226 |

OTHER PUBLICATIONS

"European Application Serial No. 18178912.4, Response filed Jun. 6, 2019 to Extended European Search Report dated Oct. 26, 2018", 25 pgs.

* cited by examiner

PORTABLE PHASED ARRAY TEST INSTRUMENT

CROSS-REFERENCE TO RELATED APPLICATIONS

This application claims the benefit and priority of U.S. Provisional patent application Ser. No. 62/523,339 filed Jun. 22, 2017 entitled AN IMPROVED PORTABLE PHASED ARRAY TEST INSTRUMENT, the entire disclosure of which is incorporated herein by reference.

FIELD OF THE INVENTION

The invention relates to ultrasonic non-destructive testing and inspection (NDT/NDI), and in particular to a portable phased array test instrument for controlling operation of one or more ultrasonic phased array probes.

BACKGROUND OF THE INVENTION

Phased array test instruments generally contain electronic components which may require re-programming to update the firmware or may require testing in order to isolate faults or error conditions during instrument maintenance. In existing practice, it is often necessary to either connect to the relevant components at the printed circuit board level, or to connect to components by means of an external connector, which is unsightly and may lead to inadvertent user errors. There therefore exists a need for a method of connecting to testable or re-programmable components without removing any circuit boards from the instrument, and without need for an external connector.

DETAILED DESCRIPTION OF PREFERRED EMBODIMENT

Figure 1:
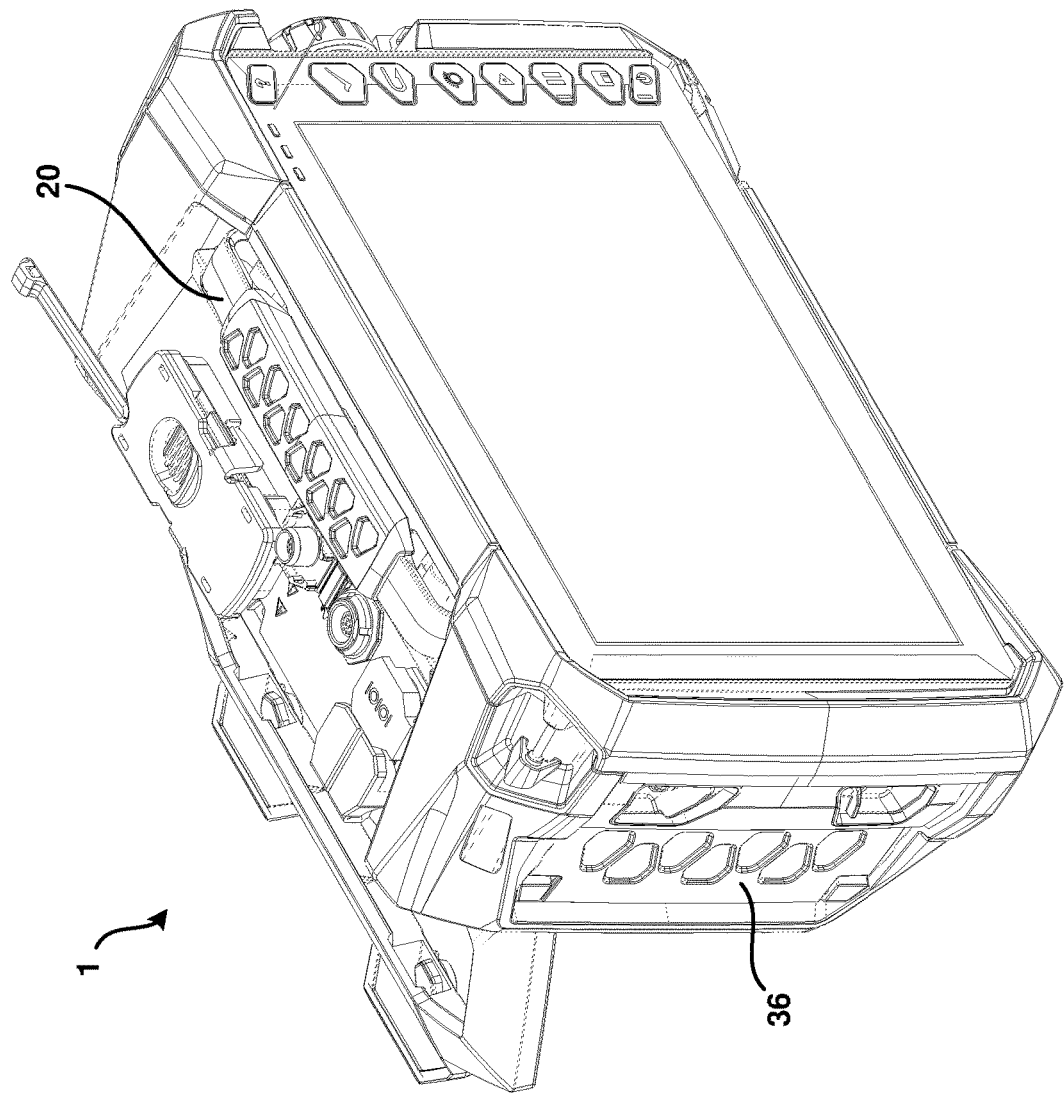
FIG. 1 is a perspective view of a portable phased array instrument according to the present disclosure.

FIG. 1 shows an isometric view of a portable phased array instrument 1 according to the present disclosure.

Figure 2:
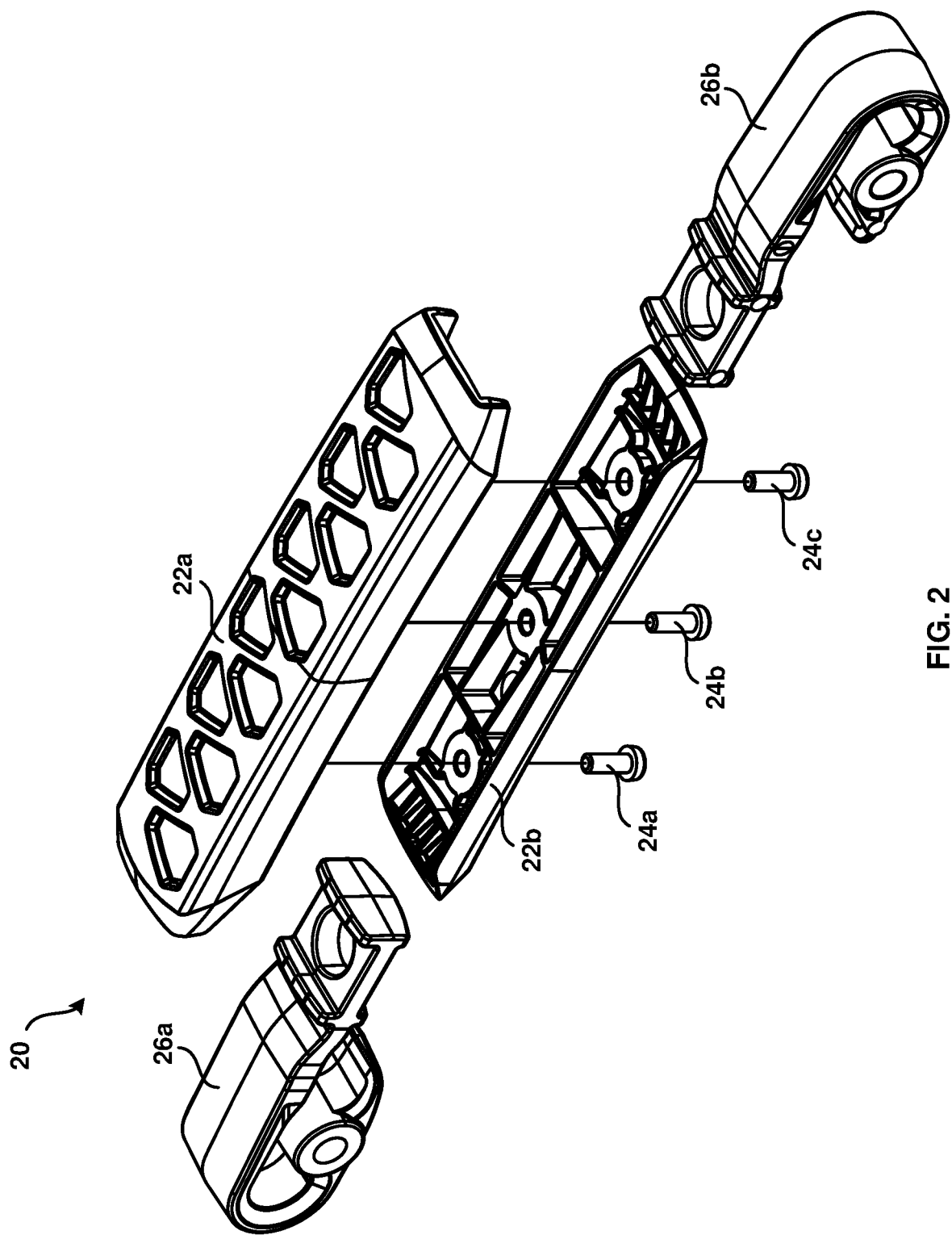
FIG. 2 is a perspective view of a handle assembly according to the present disclosure.

FIG. 2 shows the construction of a handle assembly 20 for instrument 1. In existing practice, handles may be constructed of plastic and nylon cloth sewed together with an elastic thread. This solution is functional, but expensive and aesthetically displeasing. In contrast, handle assembly 20 is constructed of custom molded parts, has lower cost, and is well integrated into the overall design of instrument 1. Handle assembly 20 comprises two rigid molded plastic parts 22a and 22b, which have good rigidity for grasping with the user's hand. Parts 22a and 22b are attached by means of screws 24a, 24b and 24c. Flexible polyurethane arms 26a and 26b are locked between parts 22a and 22b, thereby spring loading handle assembly 20 with respect to the casing of instrument 1. Thus flexible arms 26a and 26b replace the function of the elastic thread used in existing practice.

Figure 3A:
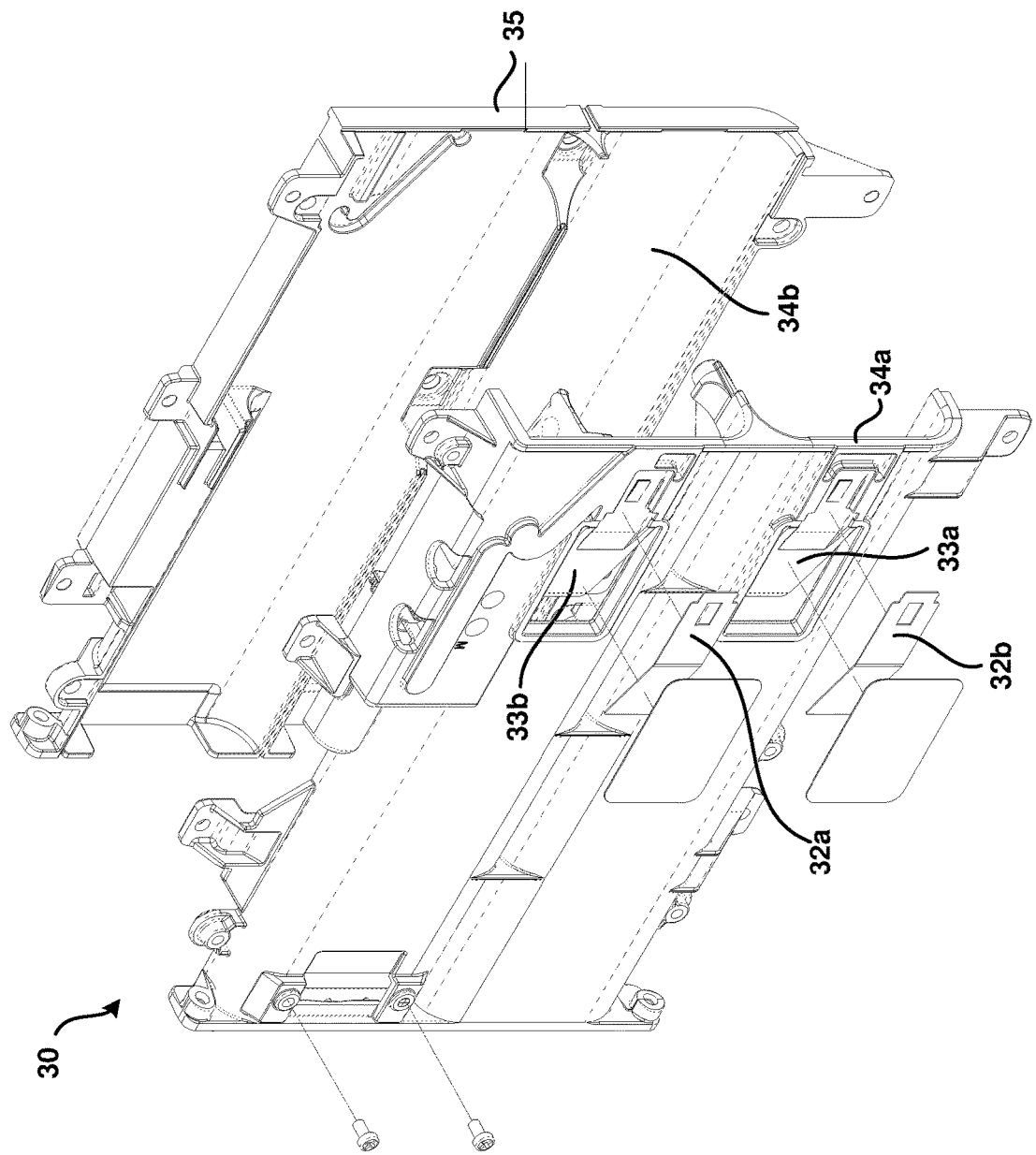
FIG. 3A is a perspective view of a battery rack according to the present disclosure.

FIG. 3A shows the construction of a battery rack 30 for instrument 1. The function of battery rack 30 is to enclose at least one battery (see FIG. 8C) and to constrain battery movement when instrument 1 is dropped or roughly handled. In existing practice, batteries are locked by quarter turn screws when a battery door is closed, which is inconvenient for the user. During a drop test, it has been observed that the batteries may push hard against the door and may break it. If the door is open, the batteries are not well constrained. In contrast, in battery rack 30 the batteries are constrained between two plastic parts 34a and 34b of a battery case, and part 34a has two metal springs 32a and 32b inserted from the outside of the case. Springs 32a and 32b are configured to reinforce plastic springs 33a and 33b (shown in FIG. 3A and in FIG. 4) that are directly molded into the plastic of part 34a. Springs 33a and 33b push on the batteries and constrain them.

Figure 3B:
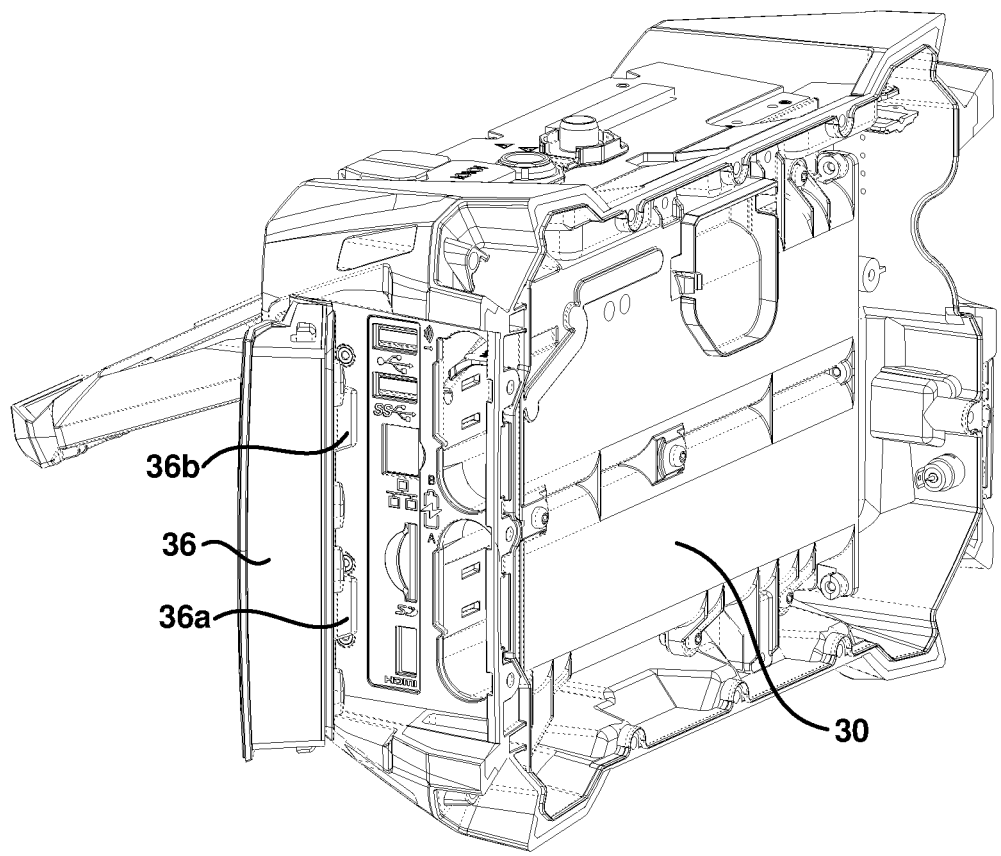
FIG. 3B is a perspective view showing a front view of a battery door according to the present disclosure.
Figure 3C:
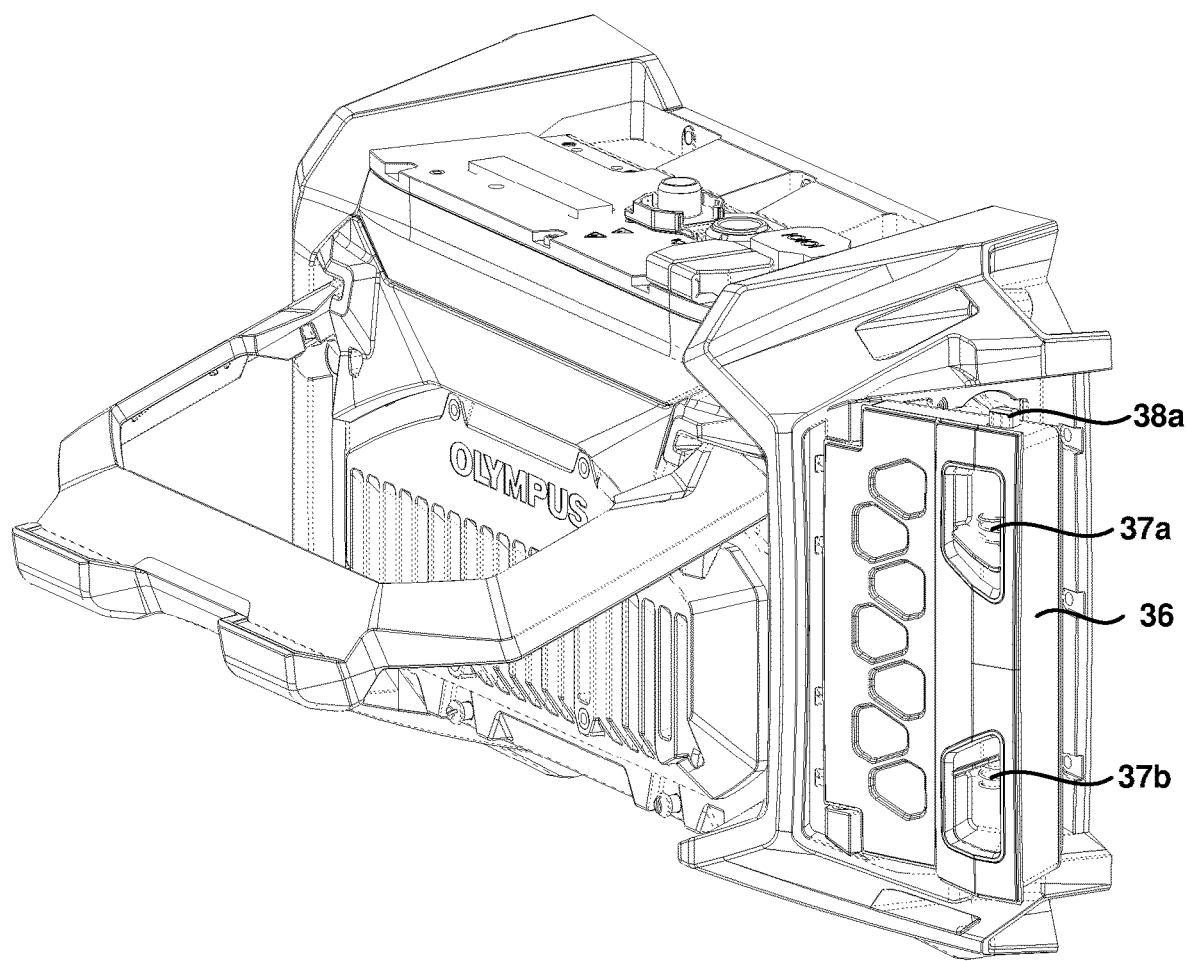
FIG. 3C is a perspective view showing a back view of a battery door according to the present disclosure.

The batteries are further constrained by a battery door 36 shown in FIGS. 3B and 3C. Door 36 has two V-shaped protrusions 36a and 36b which lock the batteries in place when the door is closed. When the door is open, the batteries are pushed against plastic part 34b by the action of springs 33a and 33b, and constrained by a lip 35 in part 34b. Therefore, the batteries are automatically locked and stay in position even if the user leaves the door open. When in the closed position, battery door 36 is secured by an upper latch 38a (FIG. 3C) and a lower latch 38b (not shown) which are activated by springs 37a and 37b respectively. Latches 38a and 38b are a more convenient replacement for quarter turn screws used in existing practice. The design ensures that when instrument 1 is dropped or roughly handled, the batteries are fully constrained by battery rack 30 and battery door 36, door 36 being secured by latches 38a and 38b.

Figure 4:
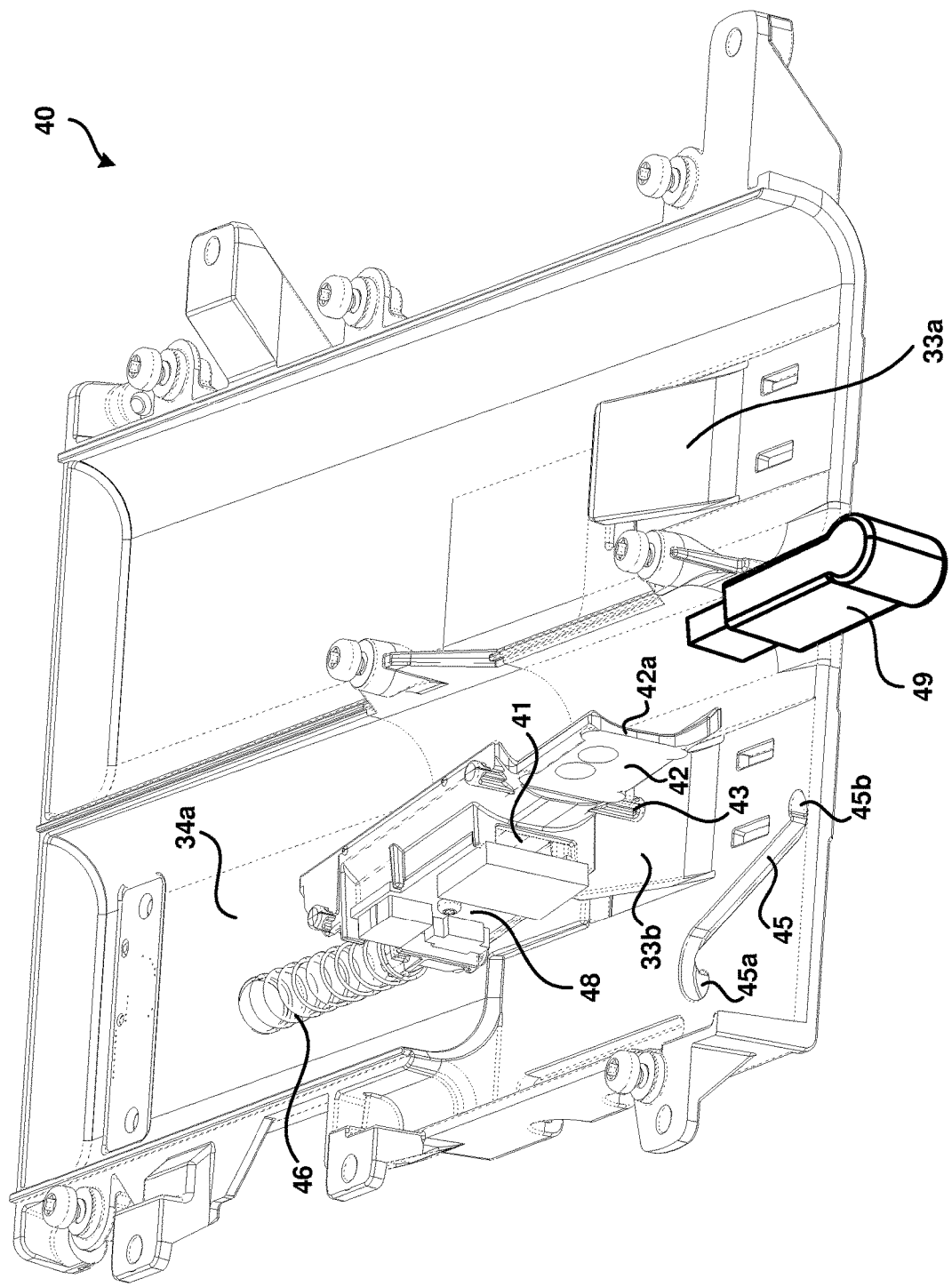
FIG. 4 is a perspective view of a USB dongle mounting assembly according to the present disclosure.

FIG. 4 shows the construction of a dongle mounting assembly 40 for instrument 1. Instrument 1 uses standard communication technologies, such as both Wi-Fi® and Bluetooth® technologies. Instrument 1 uses an integration method alternative to existing well-known practices by means of a connecting technology dongle 49. Examples of the standard connecting technology are USB, WiFi®, Bluetooth®, etc. However, an industry standard requires that USB dongle 49 should be removable without using any tool. In addition, it is preferable that dongle 49 should be hidden from the user. As shown in FIG. 4, USB dongle 49 is mountable on a printed circuit board (PCB) 48, which includes a USB port 41 for insertion of USB dongle 49. PCB 48 is attached to a plastic sliding support 42 allowing it to slide between parts 34a and 34b of battery rack 30. Sliding support 42 includes a post 43 which is captured in a slot 45 in part 34a. Slot 45 includes an inner position hole 45a and an outer position hole 45b. When post 43 is in outer position hole 45b, sliding support 42 is in the outer position, permitting easy insertion or removal of dongle 49 from battery rack 30. When post 43 is in inner position hole 45a, sliding support 42 is in the inner position, and dongle 49 is concealed within battery rack 30. Sliding support 42 may be moved back and forth between the inner and outer positions by a user pressing on an edge 42a of sliding support 42. Motion of sliding support 42 between inner and outer position, and retention of sliding support 42 in either position, is facilitated by the action of a spring 46.

Note that, by configuring dongle mounting assembly 40 to be contained within battery rack 30, sealing for water tightness is provided by battery door 36, and there is no need to provide any additional sealing, such as would be the case if connection to USB port 41 were provided on the outer case of instrument 1.

Figure 5:
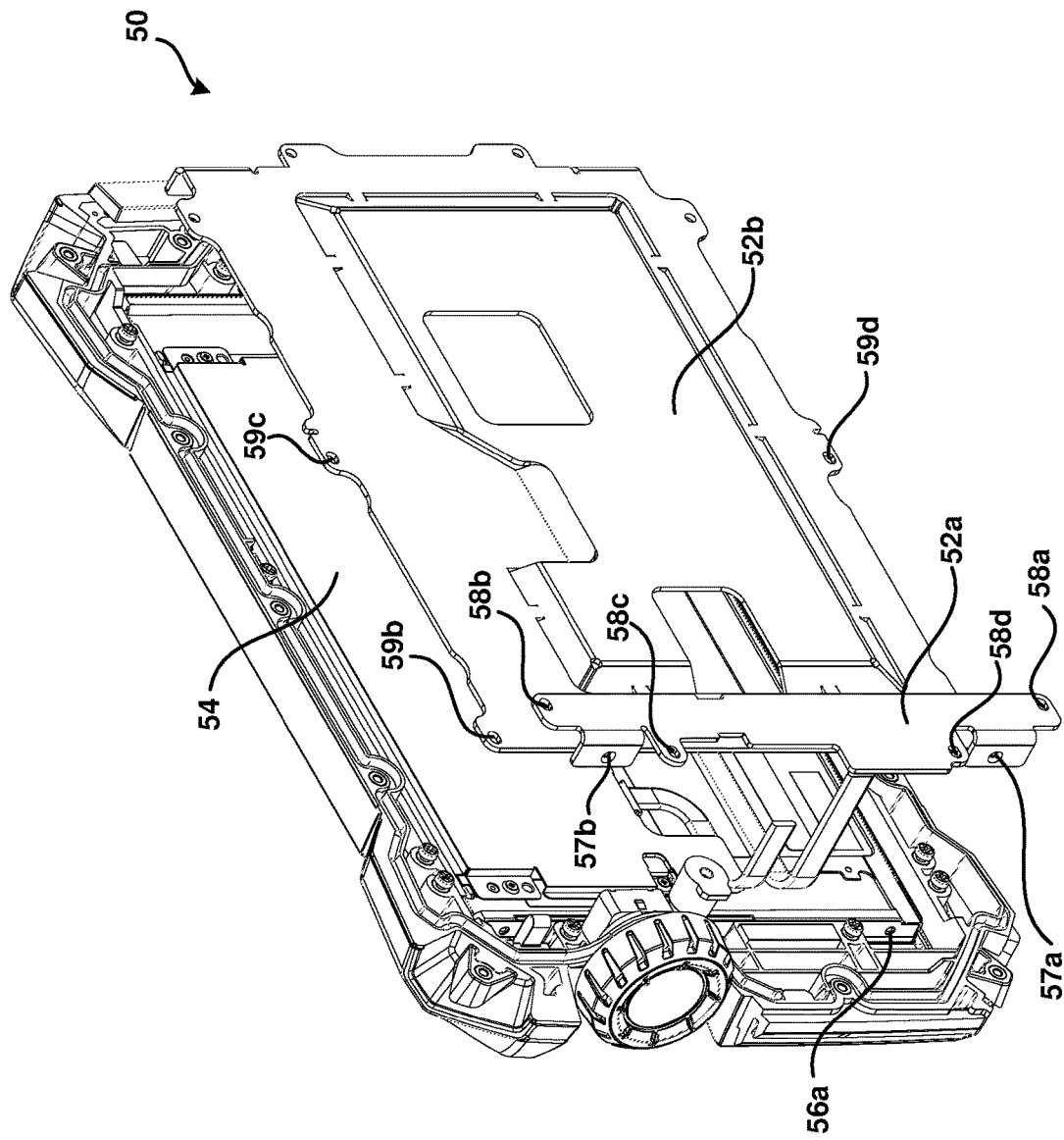
FIG. 5 is a perspective view of a screen support assembly according to the present disclosure.

FIG. 5 shows the construction of a screen support assembly 50 for instrument 1. The function of screen support assembly 50 is to provide adequate support for a screen 54 which has only four small tapped holes 56a, 56b, 56c and 56d (holes 56b, 56c and 56d are not shown) provided for attachment. A one-piece support for screen 54 is inadequate because of the manufacturing tolerances of screen 54, particularly in the horizontal direction. As a result of the tolerances, a single support plate would have to be made oversize. However, four small screws matched to the tapped holes cannot exert enough force to compress an oversize single support plate.

As shown in FIG. 5, screen support assembly 50 provides support for screen 54 using two parts 52a and 52b, whose relative horizontal positions may be varied to account for manufacturing tolerances of screen 54. Parts 52a and 52b are both first fixed to screen 54. Part 52a is fixed with two flat head screws through holes 57a and 57b into tapped holes 56a and 56b in screen 54. Part 52b is fixed with two flat head screws through holes 57c and 57d (not shown) into tapped holes 56c and 56d in screen 54. Part 52b is then located on the plastic enclosure of instrument 1 with location pins. Parts 52a and 52b are then screwed to the plastic enclosure with horizontal tolerance being taken up by slotted holes 58a, 58b, 58c and 58d in part 52a and slotted holes 59a, 59b, 59c and 59d in part 52b. The slotted holes ensure that wide manufacturing tolerances of screen 54 will not prevent parts 52a and 52b from being fixed to the plastic enclosure. In addition, the horizontal dimensions of parts 52a and 52b allow for a gap between the parts when they are fixed to screen 54, the gap being large enough to account for the tolerance in the horizontal dimension of screen 54.

Figure 6:
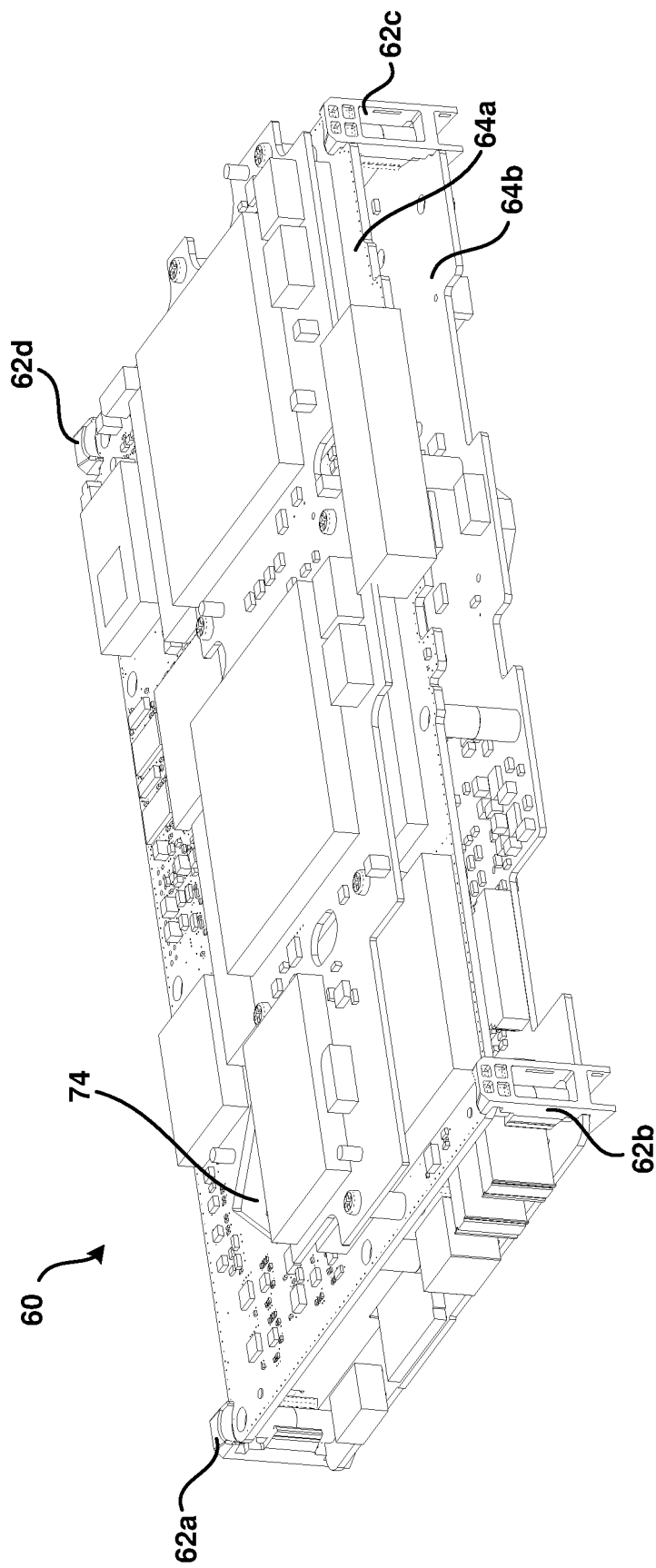
FIG. 6 is a perspective view of electronic components according to the present disclosure.

FIG. 6 shows electronic components 60 for instrument 1, comprising a representative first circuit board 64a and a representative second circuit board 64b, and featuring board clips 62a, 62b, 62c and 62d. Boards 64a and 64b are electrically connected by connectors, and normally reside within the enclosure of instrument 1. However, it is a requirement that electronic components 60 should be electrically tested outside the enclosure, and that, after testing, boards 64a and 64b should remain securely in position and electrically connected while being re-inserted into the enclosure of instrument 1. In the absence of board clips 62a, 62b, 62c and 62d, the relative locations of boards 64a and 64b are maintained only by the electrical connectors and there is a significant risk of electrical disconnection when inserting electronic components 60 into the enclosure of instrument 1. By using four plastic clips 62a, 62b, 62c and 62d, one on each corner of electronic components 60, boards 64a and 64b are securely connected during testing and subsequent insertion into instrument 1. Within the enclosure of instrument 1, electronic components 60 is secured to the enclosure by screws inserted through holes (not shown) in the undersides of board clips 62a, 62b, 62c and 62d, and through matching holes in both boards 64a and 64b. Board clips 62a, 62b, 62c and 62d are captured by the screws, and remain securely in place, securing the location of boards 64a and 64b even in the event of impact to instrument 1.

Figure 7:
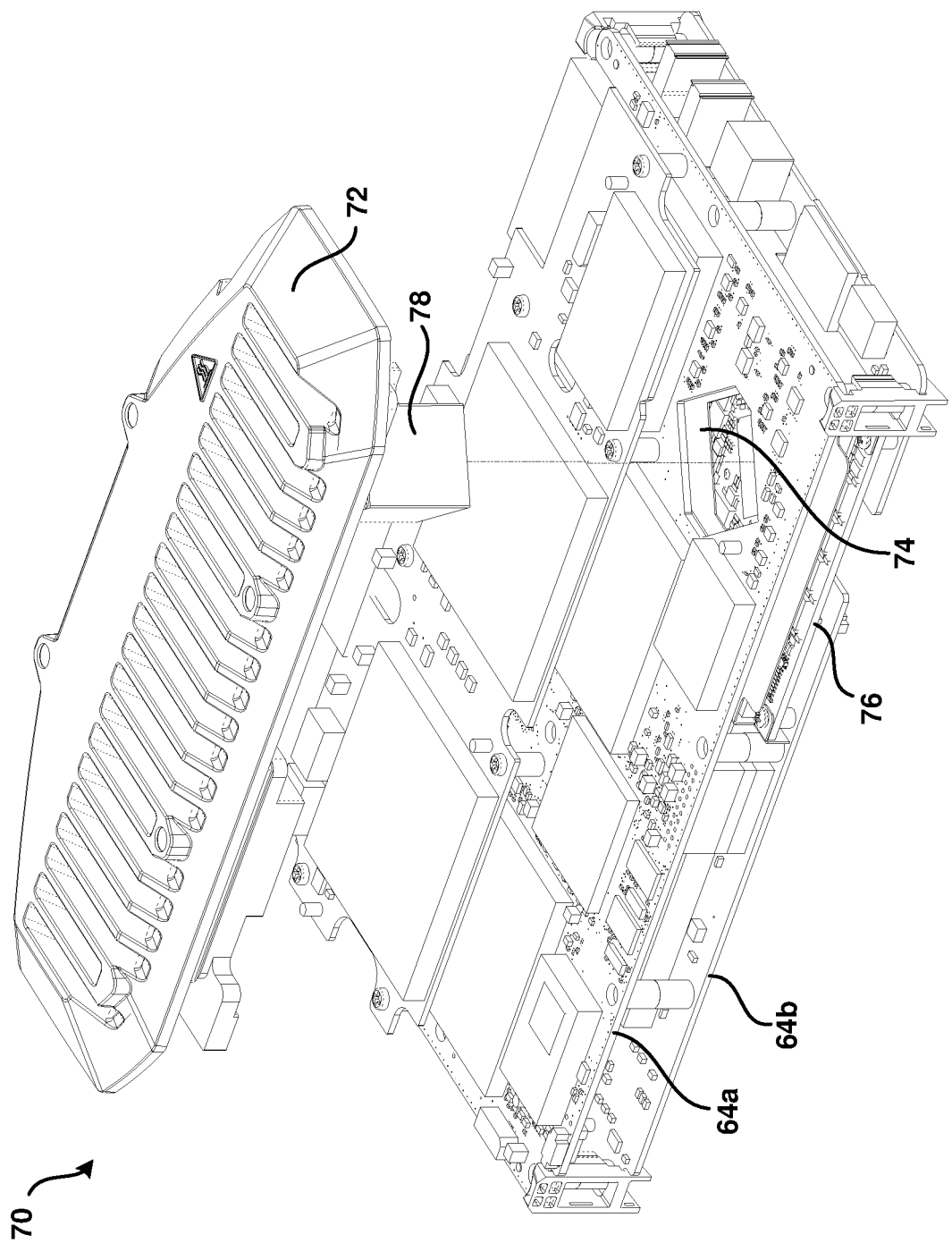
FIG. 7 is a perspective view of a board stack and heatsink assembly according to the present disclosure.

FIG. 7 shows a board stack and heatsink assembly 70 for instrument 1, assembly 70 comprising a heatsink 72, representative boards 64a and 64b, and an intermediate circuit board 76 stacked on board 64b. If heatsink 72 were only mounted on board 64a then there would be no mechanism for dissipation of heat generated by electronic components on board 76. This is representative of a general problem that some boards of any board stack are not directly in contact with the heat sink for heat dissipation. The problem is mitigated in board stack and heatsink assembly 70 by creating an aperture 74 on board 64a, and configuring heatsink 72 with a protrusion 78 which protrudes through aperture 74, thereby allowing direct thermal contact between board 76 and heat sink 72. With this arrangement, heat can be efficiently extracted from all boards in the board stack.

Figure 8A:
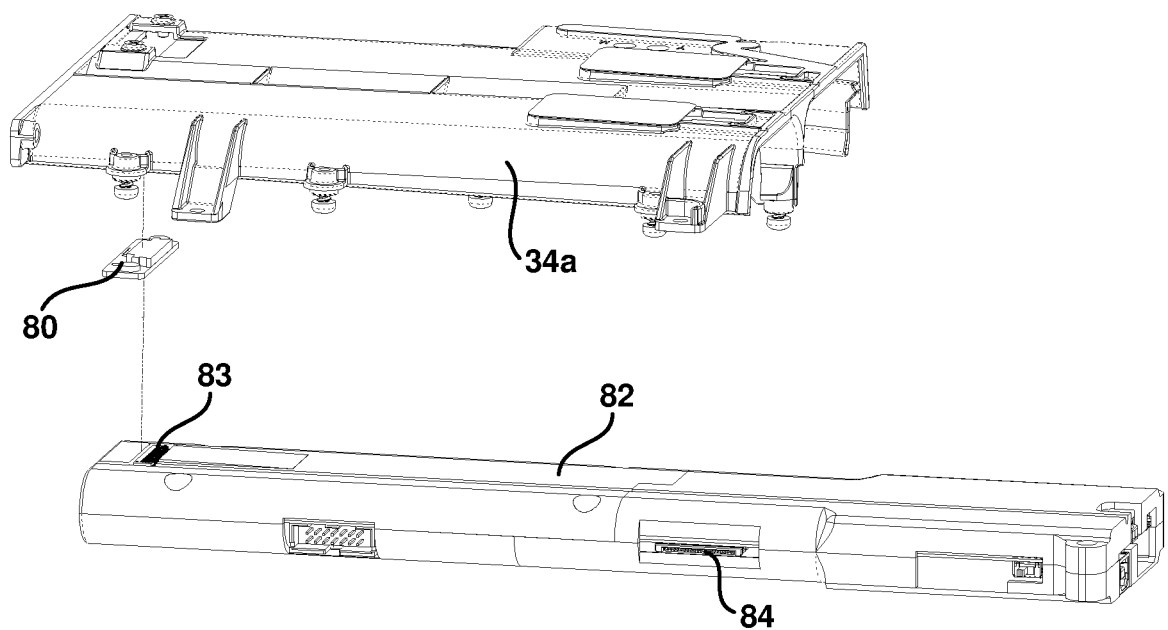
FIG. 8A is a first perspective view showing insertion of an exchangeable re-programming module into a battery rack according to the present disclosure.
Figure 8B:
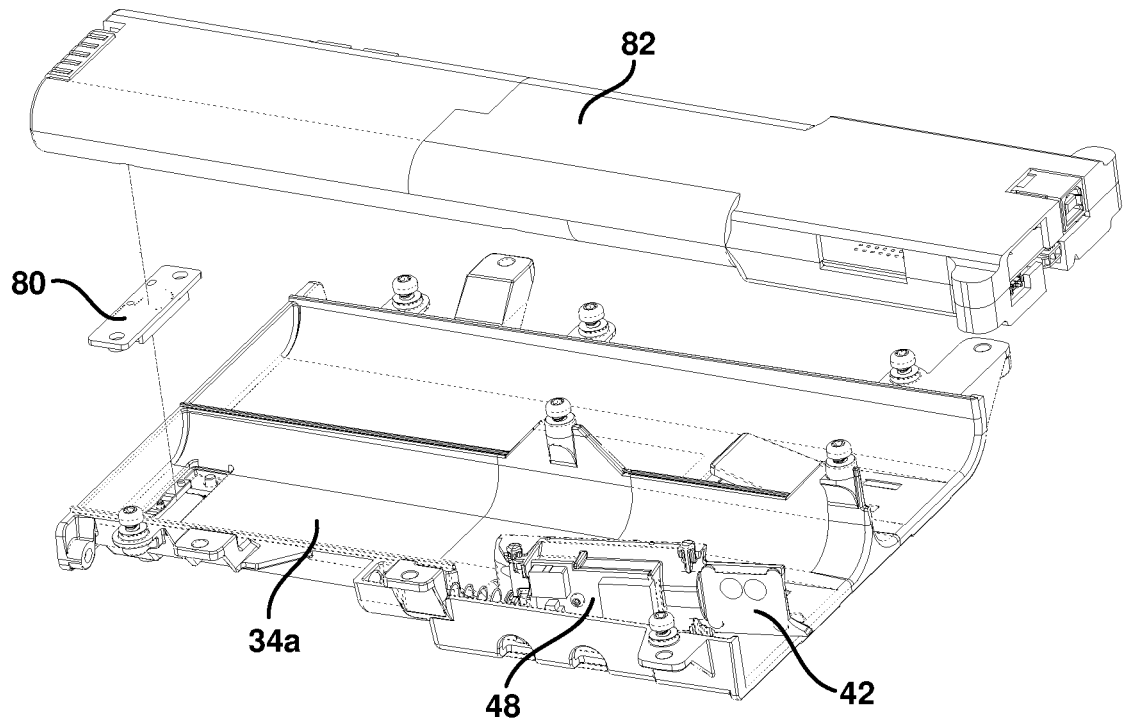
FIG. 8B is a second perspective view showing insertion of the exchangeable re-programming module into the battery rack according to the present disclosure.

FIGS. 8A and 8B illustrate a method of making connection to the boards of instrument 1 for the purpose of testing or re-programming electronic components. The necessary connections to the boards are made by means of a JTAG (Joint Test Action Group) connector 80. Instrument 1 incorporates multiple boards with electronic components 60 (see FIG. 6), some or all of which may require testing or re-programming. It is desirable to provide electrical connectivity to testable or re-programmable components without needing to open the enclosure of instrument 1, and without the need for an unsightly external connector which is visible to the user. JTAG connector 80, preferably comprised of a printed circuit board with flat conductive contact traces, is configured to be inserted into a connector cavity in an interior surface of battery rack 30 for the purpose of providing connections to test or re-program components. When JTAG connector 80 is inserted inside battery rack 30, the contact traces are flush with the base of part 34a of battery rack 30. JTAG connector 80 then remains permanently in position in the connector cavity.

Figure 8C:
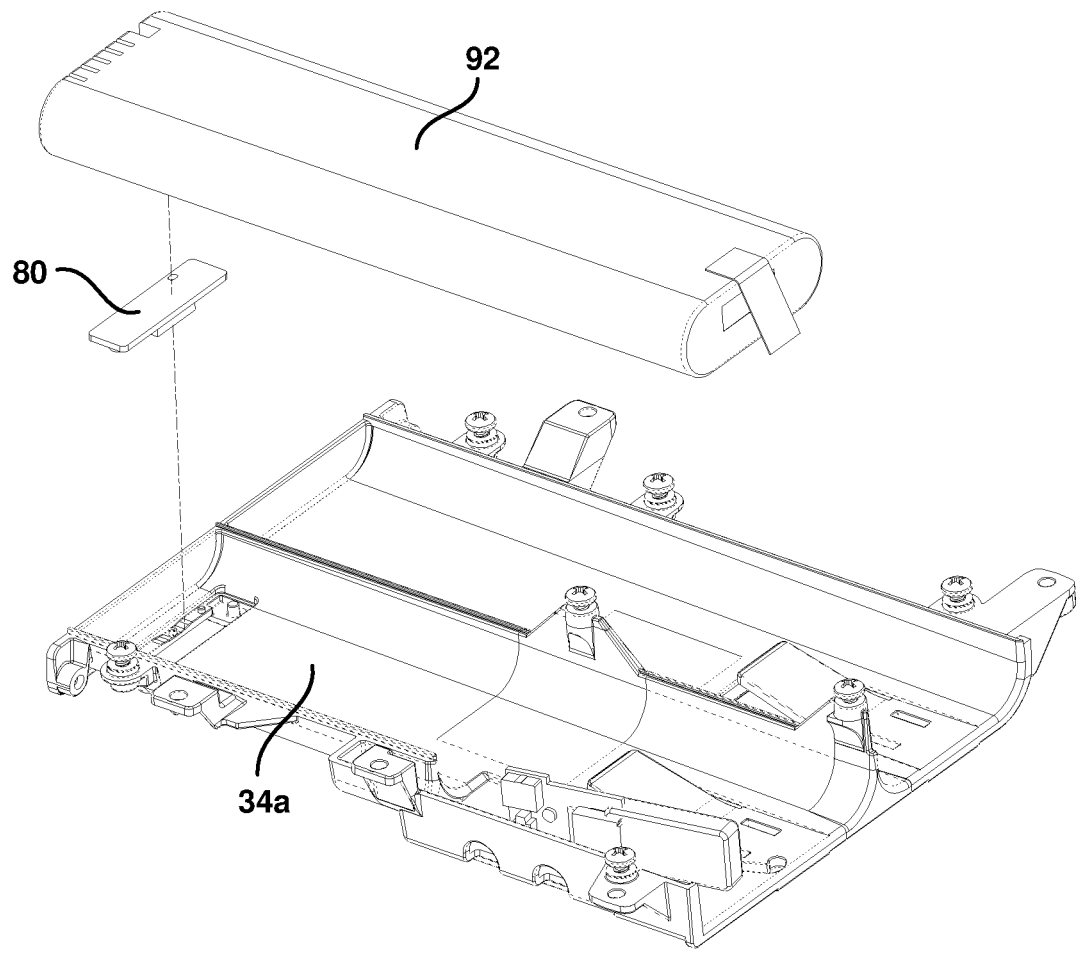
FIG. 8C is a perspective view showing insertion of a battery into the battery rack.

The casing of instrument 1 incorporates a battery cavity into which a battery 92 is inserted during normal operation of instrument 1 (see FIG. 8C). When re-programming or testing is required, battery 92 is replaced with an exchangeable re-programming module 82 which has substantially the same shape as battery 92 and can be inserted inside the battery cavity of battery rack 30 in place of battery 92. Once re-programming module 82 is inserted into battery rack 30, a spring pin connector 83 on the underside of re-programming module 82 makes electrical contact with the flat traces on JTAG connector 80, and the connections are transferred to an external cable connector 84. Cable connector 84 has cable contacts for a flat ribbon computer cable (not shown), each of the cable contacts being electrically connected to a corresponding one of the contacts of spring pin connector 83. The flat ribbon cable is connected to a computer (not shown) configured to perform the testing or re-programming.

Thus, when re-programming module 82 is inserted into the connector assembly, the computer cable is connected to cable connector 84 at a first computer cable end and to a computer at a second computer cable end.

The electronic components comprise re-programmable and/or testable electronic components and the computer is configured to re-program and/or test the electronic components.

The electronic components are configured to control the emission of non-destructive testing energy and to receive and process response signals of the energy emission.

The electronic components may be configured to have at least one ultrasonic acquisition unit. Alternatively, for non-destructive eddy current testing, the electronic components may comprise at least one eddy current controller unit. For the purpose of an X-ray analytical instrument, the electronic components may be configured to comprise an X-ray detector pulse acquisition unit and a signal processor for processing X-ray fluorescence (XRF) spectra.

Although the present invention has been described in relation to particular embodiments thereof, it can be appreciated that various designs can be conceived based on the teachings of the present disclosure, and all are within the scope of the present disclosure.

What is claimed is:

1. An instrument comprising:
   electronic components;
   at least one battery;
   an instrument casing having a battery cavity for holding the at least one battery;
   a re-programming connector connected to the electronic components and attached to the casing such that a first set of conductive contacts is substantially co-planar with a surface of the battery cavity;
   a re-programming module comprising:
      a spring contact connector having a second set of conductive contacts; and,
      a cable connector; and,
      wherein the re-programming module is configured to be inserted into the battery cavity in place of the battery, such that the second set of contacts makes electrical contact with the first set of contacts.

2. The instrument of claim 1 wherein the re-programming connector comprises a printed circuit board (PCB) and the first set of conductive contacts comprises a set of flat conductive traces on a surface of the PCB.

3. The instrument of claim 1 wherein the re-programming connector is a Joint Test Action Group (JTAG) connector.

4. The instrument of claim 1 wherein the cable connector has cable contacts for a computer cable, each of the cable contacts being electrically connected to a corresponding one of the second set of contacts.

5. The instrument of claim 4 wherein, when the re-programming module is inserted into the battery cavity, the computer cable is connected to the cable connector at a first computer cable end and to a computer at a second computer cable end.

6. The instrument of claim 5 wherein the electronic components comprise re-programmable electronic components and the computer is configured to re-program the re-programmable electronic components.

7. The instrument of claim 5 wherein the electronic components comprise testable electronic components and the computer is configured to test the testable electronic components.

8. The instrument of claim 1, wherein the electronic components are configured to control emission of non-destructive testing energy and to receive and process response signals of the testing energy.

9. The system of claim 1, wherein the electronic components comprise at least one ultrasonic acquisition unit.

10. The system of claim 1, wherein the electronic components comprise at least one eddy current controller unit.

* * * * *

UNITED STATES PATENT AND TRADEMARK OFFICE
CERTIFICATE OF CORRECTION

PATENT NO. : 10,890,565 B2
APPLICATION NO. : 16/012361
DATED : January 12, 2021
INVENTOR(S) : Spay et al.

Page 1 of 1

It is certified that error appears in the above-identified patent and that said Letters Patent is hereby corrected as shown below:

In the Claims

In Column 6, Line 31, in Claim 9, delete "system" and insert --instrument-- therefor In Column 6, Line 33, in Claim 10, delete "system" and insert --instrument-- therefor Signed and Sealed this
Thirtieth Day of March, 2021

Drew Hirshfeld
*Performing the Functions and Duties of the
Under Secretary of Commerce for Intellectual Property and
Director of the United States Patent and Trademark Office*